Nov. 25, 1930.  A. OLSSON  1,782,934
COMBINED CULTIVATOR HARROW
Filed Oct. 23, 1929   2 Sheets-Sheet 1
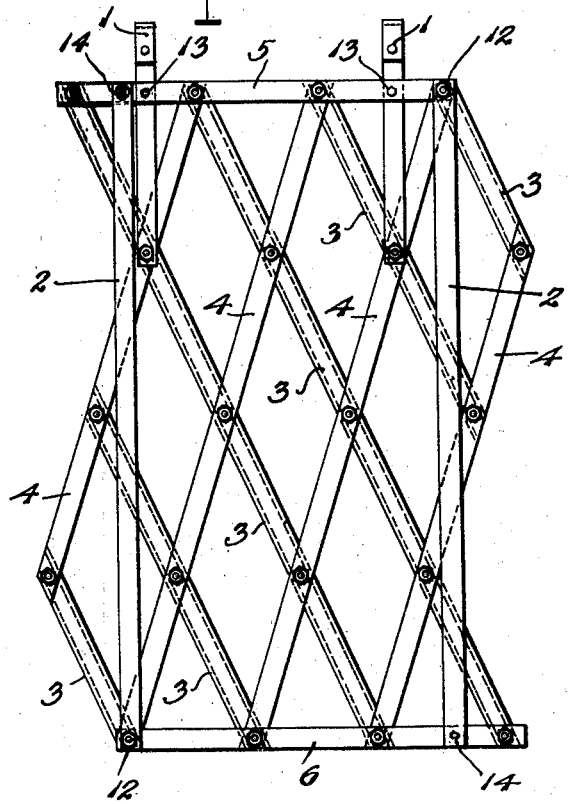
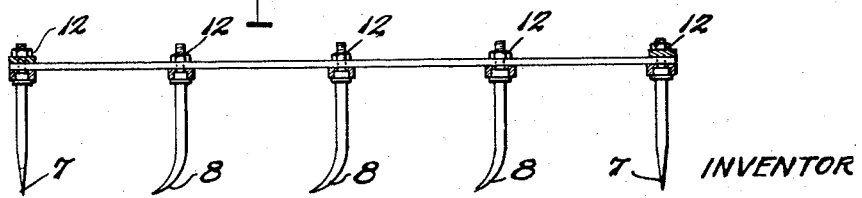
INVENTOR
A. Olsson
By
Robt Robb
ATTORNEYS Nov. 25, 1930.  A. OLSSON  1,782,934
COMBINED CULTIVATOR HARROW
Filed Oct. 23, 1929  2 Sheets-Sheet 2
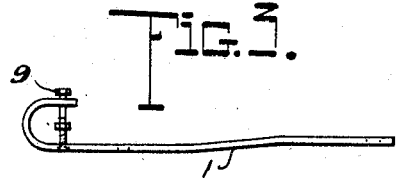
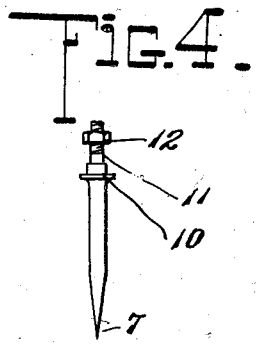
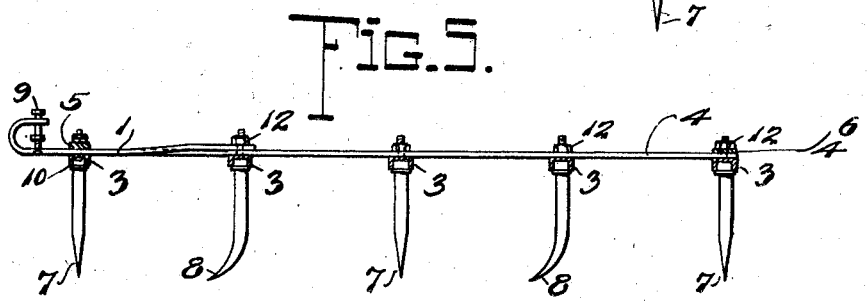
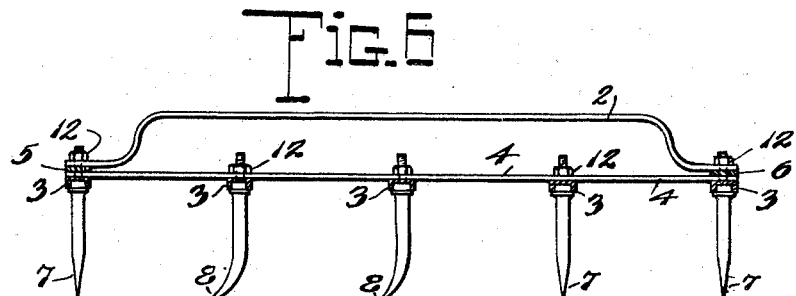
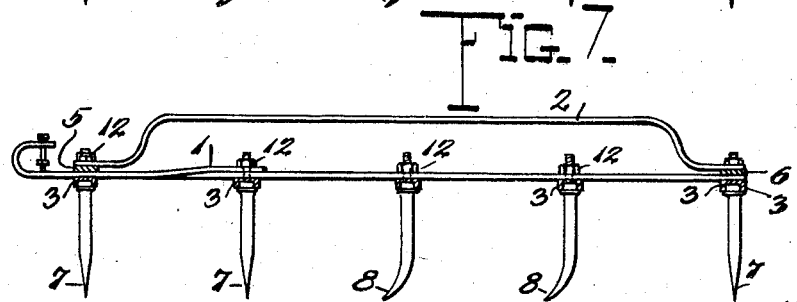
INVENTOR
A. Olsson
By
ATTORNEYS Patented Nov. 25, 1930

1,782,934

UNITED STATES PATENT OFFICE

ALFRED OLSSON, OF GUYTASA, SWEDEN

COMBINED CULTIVATOR HARROW

Application filed October 23, 1929, Serial No. 401,813, and in Sweden October 24, 1928.

This invention relates to improvements in earthworking implements and in particular to that type which I term combined cultivator-harrows.

The invention has for its primary object the provision of an agricultural implement which will be simple to manufacture and to assemble and which will function to perform both a cultivating and a harrowing action.

To this end the invention is composed of a frame made of diagonally arranged bars on which are mounted a plurality of rows of teeth, the teeth of certain of the rows being curved and the teeth of others of the rows being straight, said teeth being provided with clamping means by which the bars constituting the frame members are secured in fixed relation.

Other and further objects and advantages of the invention will be hereinafter set forth and the novel features thereof defined by the appended claim.

In the drawings:

Fig. 1 is a top plan view of the invention;

Fig. 2 is a side elevation thereof showing the preferred arrangement of the straight and curved teeth;

Fig. 3 is a detail view of a drafthook adapted to be connected to the frame of the implement;

Fig. 4 is a detail view of one of the teeth used with this device;

Fig. 5 is a longitudinal, sectional view showing a different arrangement of the curved and straight teeth; and Figs. 6 and 7 are longitudinal, sectional views showing other arrangements of the teeth and the skid bars which are arranged upon the top part of the frame.

Like numerals refer to like parts in the several figures of the drawings.

Specifically describing the invention, 1 designates draft hooks which are adapted to be connected to the frame of the combined cultivator and harrow at the forward end thereof and by means of which the harrow-cultivator may be operated. The frame of the device is composed of spaced, longitudinally extending, flat bars 2, one at each side of the frame, and U-shaped channel bars 3 arranged in parallel rows extending diagonally with relation to the side bars 2, and the oppositely arranged flat bars 4 extending in a diagonal direction and intersecting the channel bars 3 on the top of which they are disposed and fixed in a manner to be later set forth. All of these bars are connected at the front by the front bar 5 and at the rear by the rear bar 6. At the points of intersection of the diagonal bars I mount the teeth, these teeth being arranged in rows, as clearly shown in Fig. 2, the teeth of the front and rear rows, designated 7, being straight, while the teeth of the intermediate rows, designated 8, are forwardly curved.

Referring to Fig. 4, each of these teeth is formed with a stop shoulder 10 at one side of which the shank or tooth is reduced so as to fit snugly in the channel of the channel bars 3 previously referred to, and the upper end 11 of the shank is threaded to receive the clamping nut 12, by means of which the teeth and the bars are secured rigidly together.

The drafthooks are secured at one end by the teeth which pass through the intersecting diagonal bars and at the opposite end to the front bar 5, as indicated at 13. Each of these drafthooks is provided with a bolt or pin member 9 which closes the hook extremity so as to prevent displacement of the draft means for dragging the harrow-cultivator over the ground. The bolt 9 is provided intermediate its length with a stop nut which prevents displacement of the pin from the hook but which is sufficiently spaced from the head to enable it to be shifted for introducing the draft connection thereinto.

It will be observed that the side bars previously referred to curve upwardly so as to lie in spaced relation to the plane of the diagonal bars, thereby forming skids upon which the harrow-cultivator may be moved to and from the point of operation when it is turned upside down.

In the operation of this harrow-cultivator the curved teeth have a tendency to cause a deeper penetration of the teeth in the earth than would be the case if all of the teeth were straight as in the ordinary type of harrow, while the straight teeth have a tendency to prevent the harrow from jumping upwardly and downwardly as would be the case if the teeth were all curved. By this combination of straight and curved teeth arranged in the row relationship set forth, I am able to obtain the action which is usually secured by the use of two separate implements, a harrow and a cultivator.

It will be understood that I do not wish to be confined to the particular arrangement of the straight and curved teeth, as shown in Fig. 2, for these teeth may be arranged as suggested by Figs. 5, 6 and 7, and it will be furthermore apparent that the particular shape of the frame bars 3 and 4 may be changed without departing from the spirit of the invention and within the scope of the claim hereto appended.

Having thus described my invention, what I claim as new and desire to secure by Letters Patent is:

A combined cultivator-harrow of the class described, comprising a frame composed of a plurality of diagonally arranged channel bars, a plurality of flat bars diagonally arranged and extending in opposite direction to the channel bars, end bars connecting said diagonal bars together, side bars connecting said end bars together, said side bars constituting skids when the implement is inverted, drafthooks secured to one of said end bars and to the diagonal bars, pin members slidably carried by said drafthooks to close the same, said pin members having stop nuts intermediate the ends thereof to prevent displacement of said pin members from the drafthooks, a plurality of teeth arranged in rows and carried by said diagonal bars, the teeth of certain of said rows being curved and the teeth of certain other rows being straight, said teeth having shank portions formed to seat in the channels of the said channel bars to interlock the teeth and prevent shifting of the same with respect to the bars, and clamping means threadably engaging the extremity of the teeth for securing the said teeth and bars together.

In testimony whereof I affix my signature.

ALFRED OLSSON.